United States Patent
Lankalapalli et al.

(10) Patent No.: US 9,329,595 B2
(45) Date of Patent: May 3, 2016

(54) REMOTE PENDANT WITH EXTENDED USER INTERFACE

(75) Inventors: Kishore Lankalapalli, Springboro, OH (US); Mike Tanner, Cincinnati, OH (US); Justin Shultz, Franklin, OH (US); Larry D. Lucous, Beavercreek, OH (US); Robert Keith Strong, Hamilton, OH (US)

(73) Assignee: GLEASON METROLOGY SYSTEMS CORPORATION, Dayton, OH (US)

( * ) Notice: Subject to any disclaimer, the term of this patent is extended or adjusted under 35 U.S.C. 154(b) by 732 days.

(21) Appl. No.: 13/227,524

(22) Filed: Sep. 8, 2011

(65) Prior Publication Data
US 2012/0229662 A1    Sep. 13, 2012

Related U.S. Application Data

(60) Provisional application No. 61/381,588, filed on Sep. 10, 2010.

(51) Int. Cl.
*G05B 1/00* (2006.01)
*G05B 19/427* (2006.01)
*G05B 19/409* (2006.01)

(52) U.S. Cl.
CPC .......... *G05B 19/427* (2013.01); *G05B 19/409* (2013.01); *G05B 2219/23043* (2013.01); *G05B 2219/36163* (2013.01); *G05B 2219/36167* (2013.01); *G05B 2219/39439* (2013.01)

(58) Field of Classification Search
USPC ................................................. 345/173–179
See application file for complete search history.

(56) References Cited

U.S. PATENT DOCUMENTS

| 2006/0212557 | A1 | 9/2006 | Rieger et al. | |
| 2010/0039391 | A1* | 2/2010 | Spink et al. | 345/173 |
| 2011/0093822 | A1* | 4/2011 | Sherwani | 715/863 |

FOREIGN PATENT DOCUMENTS

| DE | 19951233 A1 * | 5/2000 |
| DE | 10214767 A1 | 10/2003 |
| EP | 2012208 A2 | 1/2009 |

OTHER PUBLICATIONS

International Search Report and Written Opinion for PCT/US2011/050800.

* cited by examiner

*Primary Examiner* — Michael Faragalla
(74) *Attorney, Agent, or Firm* — Robert L. McDowell

(57) ABSTRACT

A remote pendant for a metrology machine. The pendant comprises a non-configurable user interface which is an extension of the main computer monitor wherein the screens shown on a monitor of the pendant are created by application and/or control software running on the computer control of the machine. The remote pendant further comprises camera and/or webcam features as well as voice recording capabilities. With the remote pendant, the machine operator can view messages appearing on the main computer screen and respond to any prompts via a touch screen on the pendant thereby eliminating the need to return to the machine operator station.

22 Claims, 11 Drawing Sheets

REMOTE PENDANT WITH EXTENDED USER INTERFACE

This application claims the benefit of U.S. Provisional Patent Application No. 61/381,588 filed Sep. 10, 2010, the entire disclosure of which is hereby incorporated by reference.

FIELD OF THE INVENTION

The present invention is directed to machine tools, in particular to metrology machines such as gear metrology machines, and to a remote operator pendant for such machine tools.

BACKGROUND OF THE INVENTION

Today, most metrology machines for gears (and other toothed articles) and/or gear cutting tools comprise a computer-controlled electro-mechanical multi-axis system. FIG. 1, for example, shows the architecture of a known metrology system. The application software (for example, GAMA software commercially available from Gleason Metrology Systems) provides the interface to the end user to program the gear parameters, select tests and set other parameters to perform a gear inspection. It also generates required machine move commands and communicates to the control program. The control software (i.e. control program) acts as the intermediary between the application software and the rest of the system. Once the requested commands are executed, the control program provides data, such as axis positions and probe deflections, back to the application software which analyzes the information provided by the control program and provides easy-to-read charts and inspection reports to the user.

The control program is a piece of software that takes the commands from the application software and converts into commands that can be sent to the motion control hardware (MC). The control program generates the target positions for each of the machine axes along with desired velocities and sends them to the MC which generates the motion profile for each individual axis, based on certain motion parameters (such as acceleration, jerk, etc.) and interpolates as necessary. The MC card is linked to AC servo drives on a motion control network (i.e. communication network) using an interface such as SERCOS, for example. The MC generates the commands for the servo drives which in turn send the signals to the motors. When the motors move the mechanical axes, the feedback devices (e.g. glass scales) attached to the mechanical axis generate a signal to indicate the current position of all the axes (linear and rotary). The drives perform the closed-loop control for each command received from the MC until the target position is reached. The control program receives the current position of the axes at any instant via the MC.

A three dimensional (i.e. 3D) scanning probe is attached to an axis (e.g. the X-axis) of a gear metrology machine which is driven to make physical contact with a gear placed on a rotary table of the machine. The control software reads the probe deflections (for example, in mutually perpendicular X, Y and Z directions of the probe) via a counter card plugged into a PCI slot on the machine computer (i.e. the PC). The counter card receives the probe deflections via an interpolator unit connected to the probe. The control software ensures that the axes positions and probe deflections are synchronized and provides all the data back to the application software.

As shown in the FIG. 1, the application software and the control software run on a PC (e.g. off-the-shelf industrial PC) running Windows OS for example. Preferably, both application and control programs are written in VB.Net but any appropriate software programming language and operating system combination may be utilized. The MC and the counter card are plugged into the PCI slots inside the PC. Normally, a monitor and a keyboard/mouse attached to the PC act as user input devices.

The PC resides in an electrical control cabinet of the machine (see FIG. 2b) along with the drives and other electrical and electronic components. The operator station (FIG. 2a), which includes the monitor 3 and printer, is usually located outside the machine allowing easy access to the operator. While the application software provides the interface to create part programs and other machine settings required to inspect gears, there are a few manual operations that require a different interface. An example of this is an operator panel which allows the user to manually effect (i.e. jog) movement along or about an axis manually. The operator panel 2 shown in FIG. 3, has two joysticks 4, 6. A first joystick 4 controls X and Y axes and the other joystick 6 controls Z and rotary (A) axes. There is an axis selector switch 8 to allow the users to jog only one axis at a time. This helps the user to have more control when manually jogging one axis by preventing inadvertent movement of other axes. Another control 10 on the panel controls the jogging speed. There are two buttons 12, 14 on the operator panel. Button 12 turns the drives ON and button 14 clears and/or resets any faults generated by the system. In addition, there is an E-STOP 16 to stop the machine in case of emergencies.

FIG. 4 shows how the operator panel may be interfaced to the machine. The joysticks are connected to the PC via USB interface. The control software reads and deciphers the signals from the joysticks and generates appropriate motion commands and sends them to MC. There is an Input/Output (I/O) device/hardware in the system that is controlled by the control software (in some instances, the MC card may provide a few I/O ports). The axis selector, feedrate control and other switches (or LEDs) are connected to the control program via the I/O interface. The control program reads the inputs and modifies the motion commands as necessary. The operator panel described by FIG. 4 is attached to the machine and is not moveable (see also FIG. 2a).

There are different sizes of gear metrology machines to provide the capacity to inspect different size gears. For example, a product line may include machines with gear diameter capacity ranging from 175 mm to 3000 mm or more. As the machine size increases, the operator often will have to climb on the machine to access the gear on the rotary table. An operator panel attached to the machine is cumbersome to use in such instances and there is a need for a remote pendant that the operator can carry along and use for jogging the machine axes as needed.

A prior art example of one such a device is shown in FIG. 5. In this device, a remote joystick controller (RJC) 18 connects to the PC via a USB interface and communicates with the Control Program similar to the joysticks on the operator panel. The RJC also has the axis select and feedrate control features that the operator panel features. Such a RJC device has been offered on gear metrology machines. While the RJC offers the remote jogging capability, the users of gear metrology machines would benefit from additional functionality offered on a remote device.

US 2010/0039391 to Spink et al. discloses a pendant for programming and controlling a coordinate measuring machine (CMM). The pendant comprises one or more microprocessors and is capable of controlling a CMM directly. The pendant is effectively a computer by itself running firmware on dedicated electronic hardware embedded inside the pendant. The pendant also provides a full-fledged graphical user interface (GUI) which is configurable by the end user and is intended to be a sole interface to the user. The GUI is created on the pendant and is available only on the pendant.

There exists a need for an enhanced, simpler and less expensive pendant whereby the productivity of a metrology machine can be improved.

SUMMARY OF THE INVENTION

The present invention is directed to a remote pendant for a metrology machine. The pendant comprises a non-configurable user interface which is an extension of the main computer monitor wherein the screens shown on a monitor of the pendant are created by application and/or control software running on the PC of the machine. The remote pendant further comprises camera and/or webcam features as well as voice recording capabilities. With the remote pendant, the machine operator can view messages appearing on the main computer screen and respond to any prompts via a touch screen on the pendant thereby eliminating the need to return to the machine operator station.

BRIEF DESCRIPTION OF THE DRAWINGS

FIG. 10 illustrates an example of a default screen displayed on the remote pendant when it is turned ON.

DETAILED DESCRIPTION OF THE PREFERRED EMBODIMENT

Figure 1:
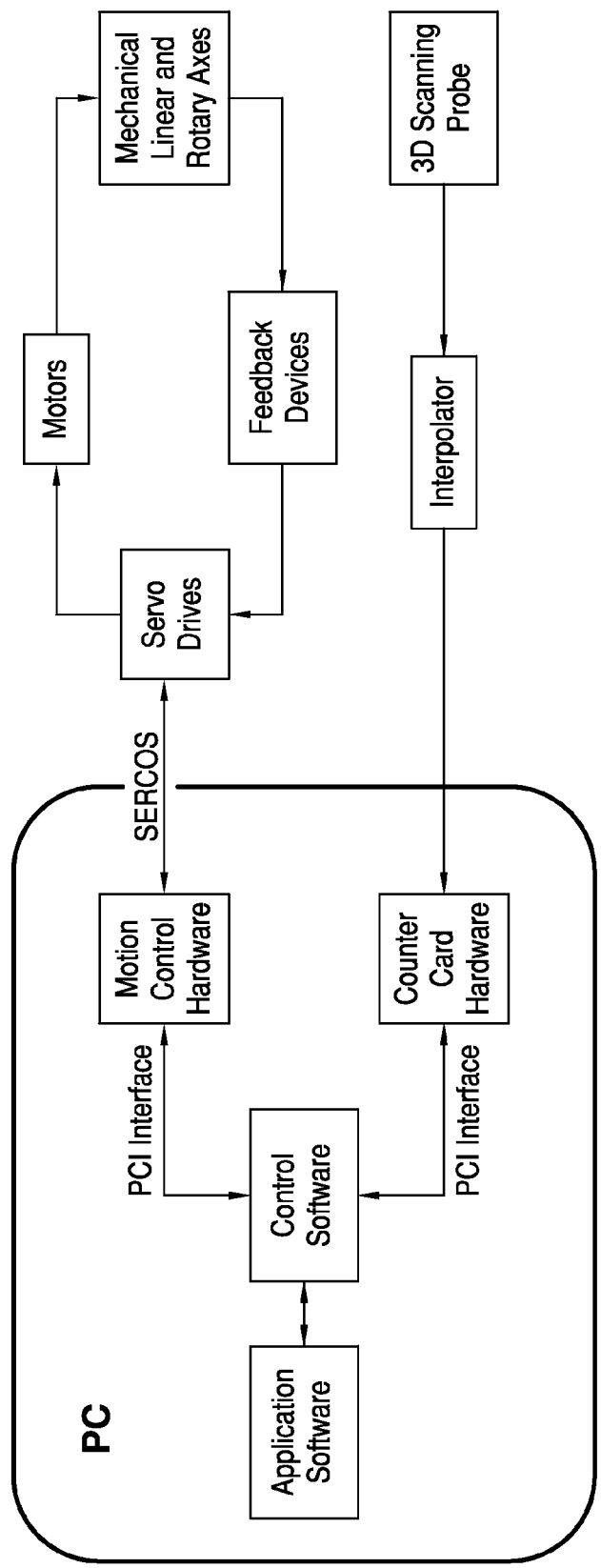
FIG. 1 diagrammatically illustrates the architecture of a known metrology system.

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

Figure 14:
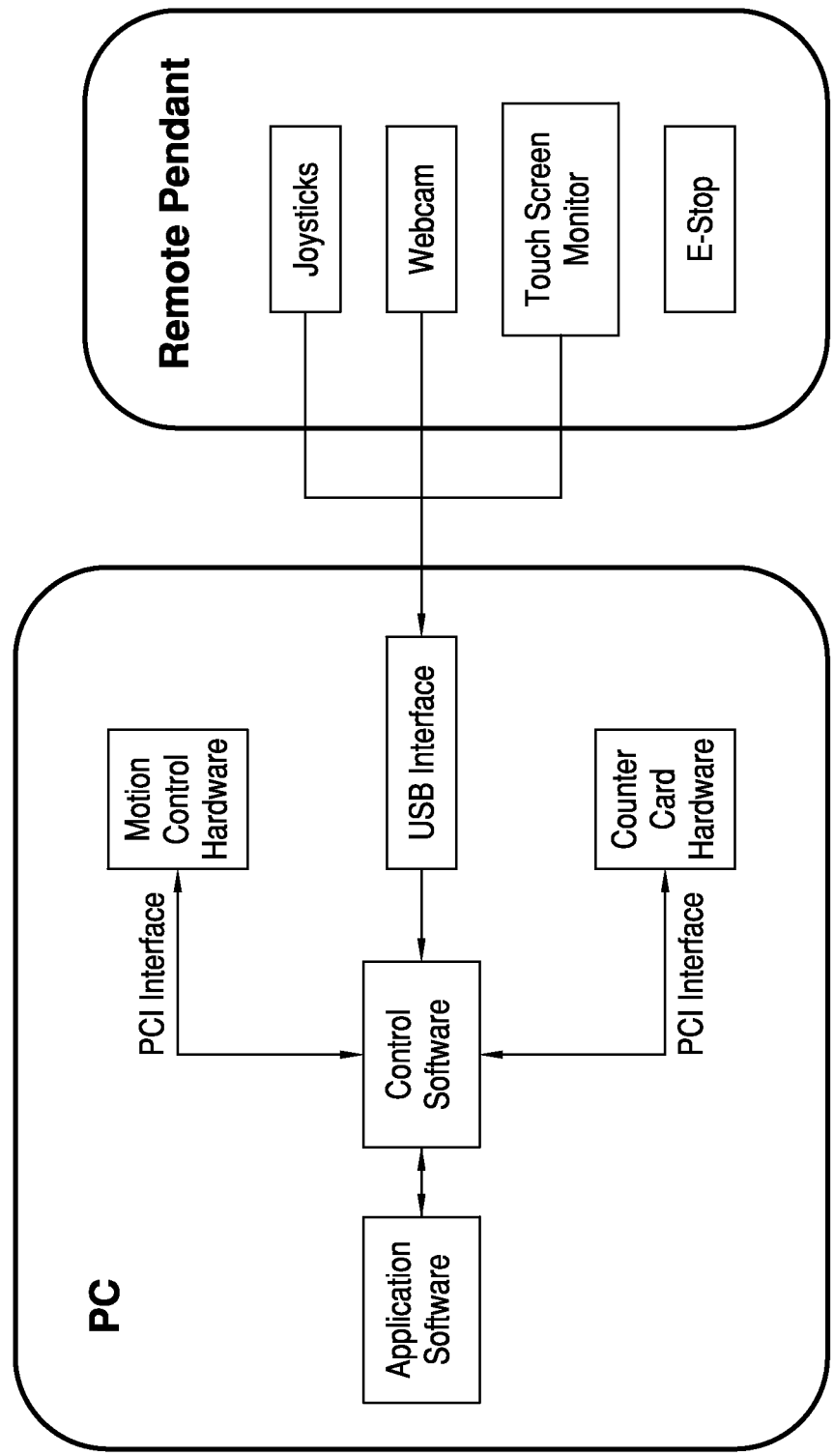
FIG. 14 diagrammatically illustrates the connection of the inventive remote pendant to the machine PC.

FIGS. 6-9 show a remote pendant 20 of the present invention preferably comprising two joy sticks 22, 24, an E-Stop 26 and a touch screen monitor 28 (e.g. 7 inch monitor). A webcam 30 (FIGS. 8 and 9) with a microphone is preferably integrated into the remote pendant 20. The microphone is preferably located in the face 31 of the camera 30 and may take the form of one or more small openings in the face of the camera. Preferably, the touch screen monitor 28, joy sticks 22, 24 and the webcam 30 are all USB devices (e.g. commercially available devices) and connect to the PC via USB interface (FIG. 14) or Ethernet. Alternatively, the connection between the remote pendant 20 and the PC may be wireless. The remote pendant 20 has no electronics or firmware thereon other than a USB hub and what is in the touch screen monitor, camera, etc.

The inventive remote pendant comprises a non-configurable user interface which is an extension of the main computer monitor 3 and the screens are created by the application and/or control software running on the PC.

Figure 2A:
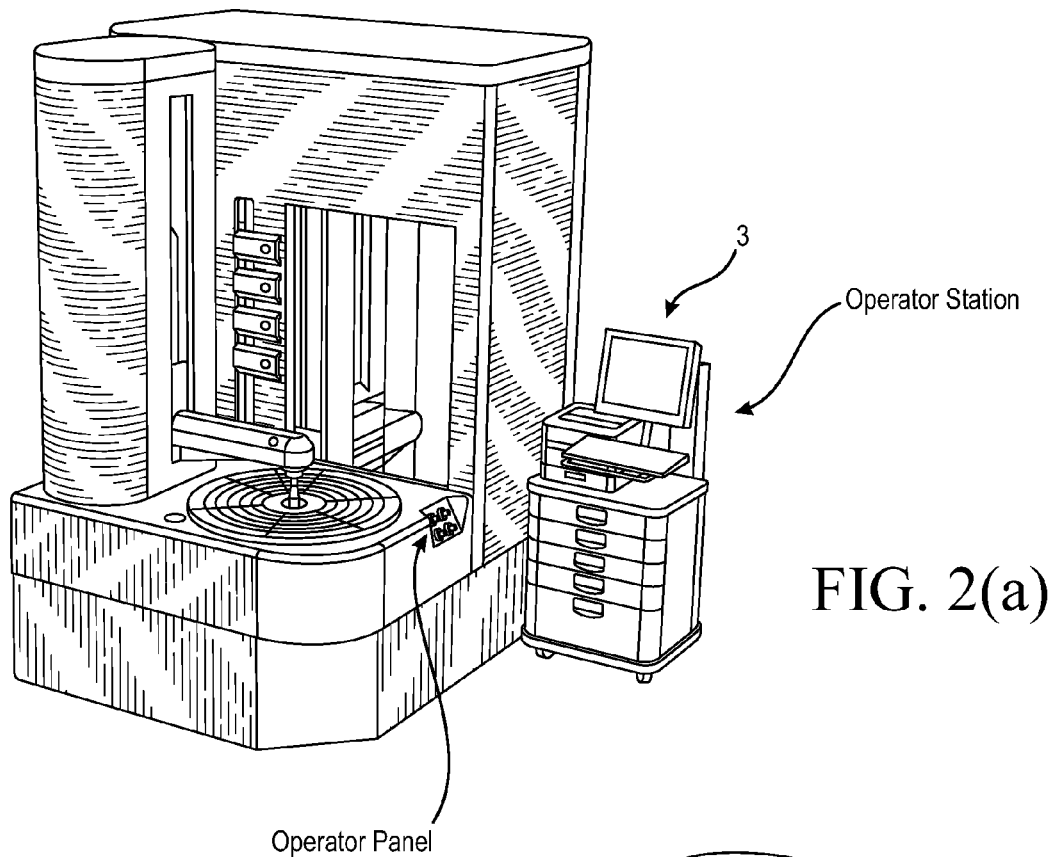
FIG. 2(a) illustrates the location of the operator panel and operator station on a type of gear metrology machine.
Figure 2B:
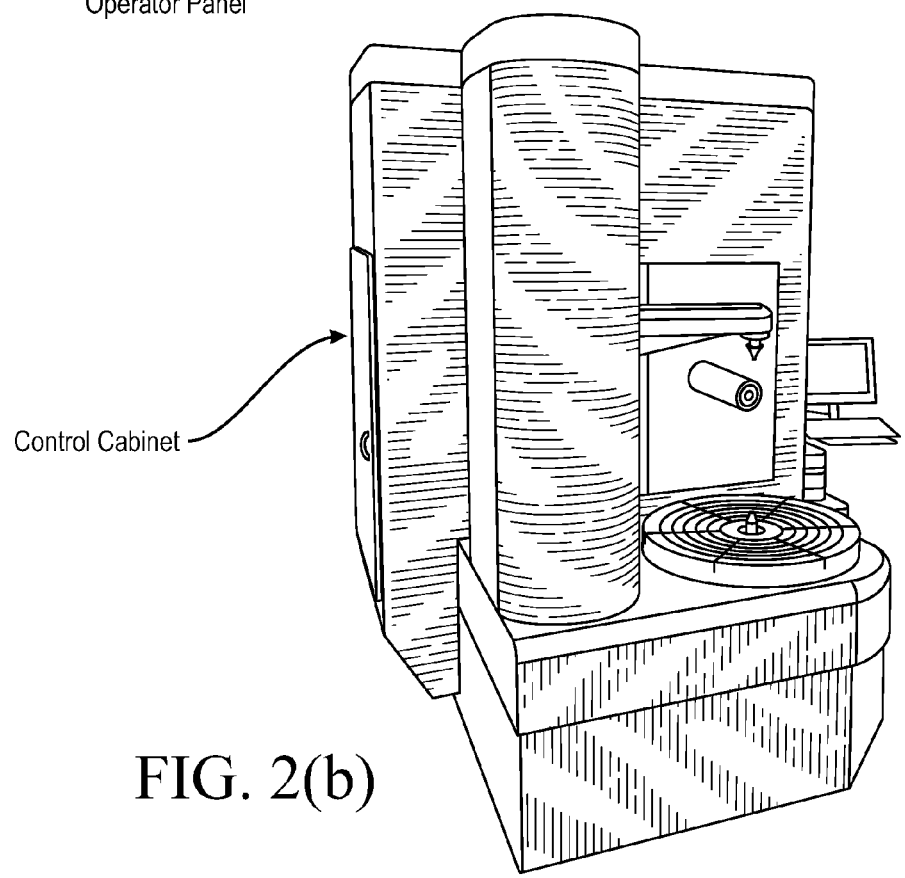
FIG. 2(b) illustrates the location of the control cabinet on a type of gear metrology machine.
Figure 3:
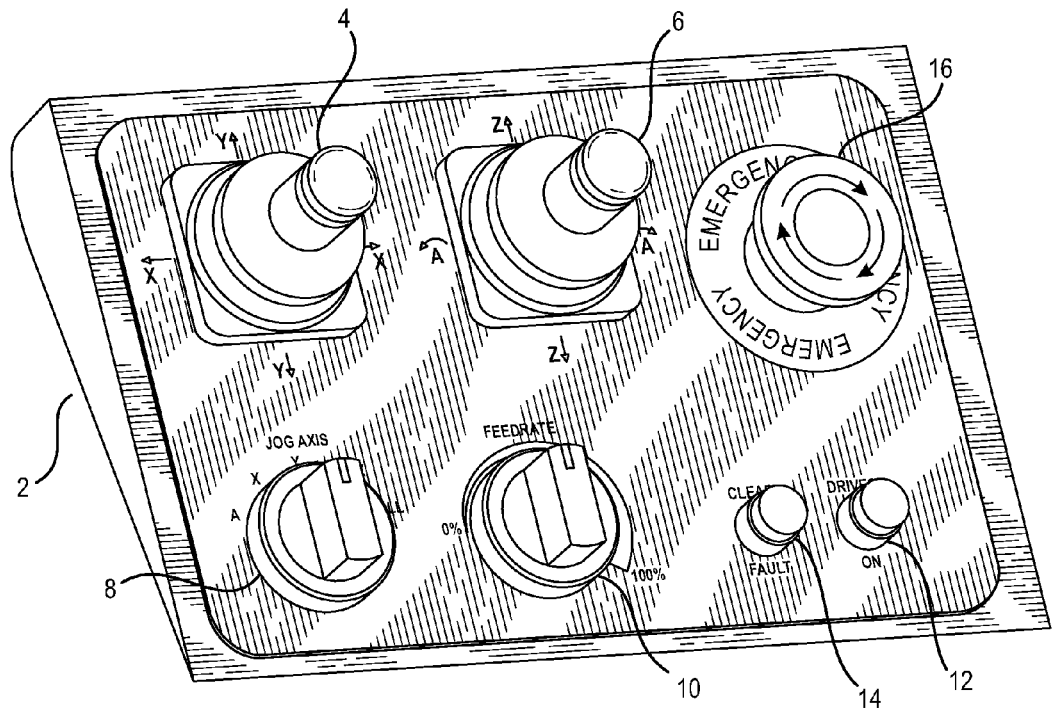
FIG. 3 is an enlarged view of the operator panel of FIG. 2(a).
Figure 5:
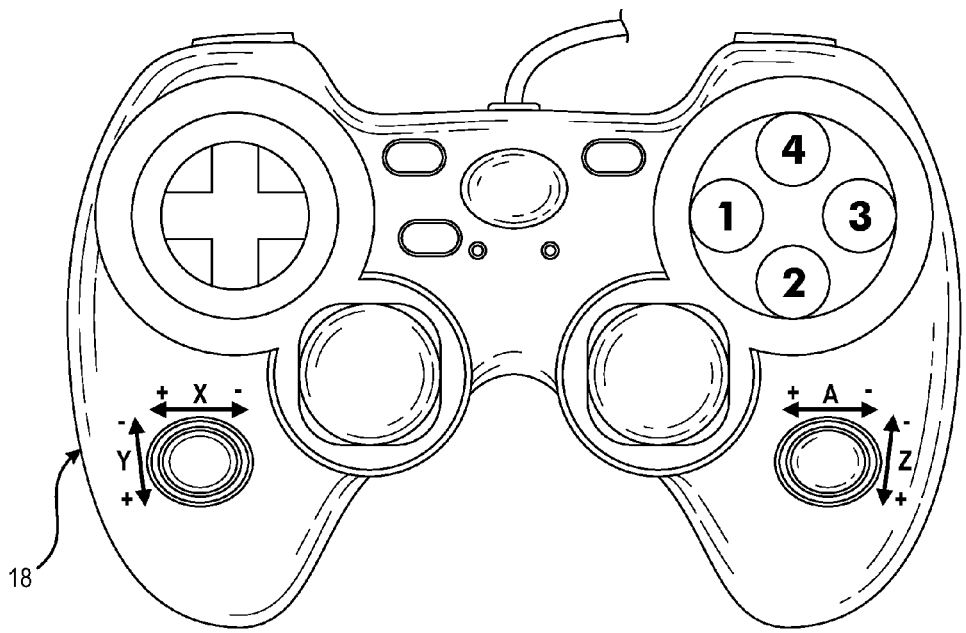
FIG. 5 illustrates a prior art example of a remote pendant for a gear metrology machine.
Figure 4:
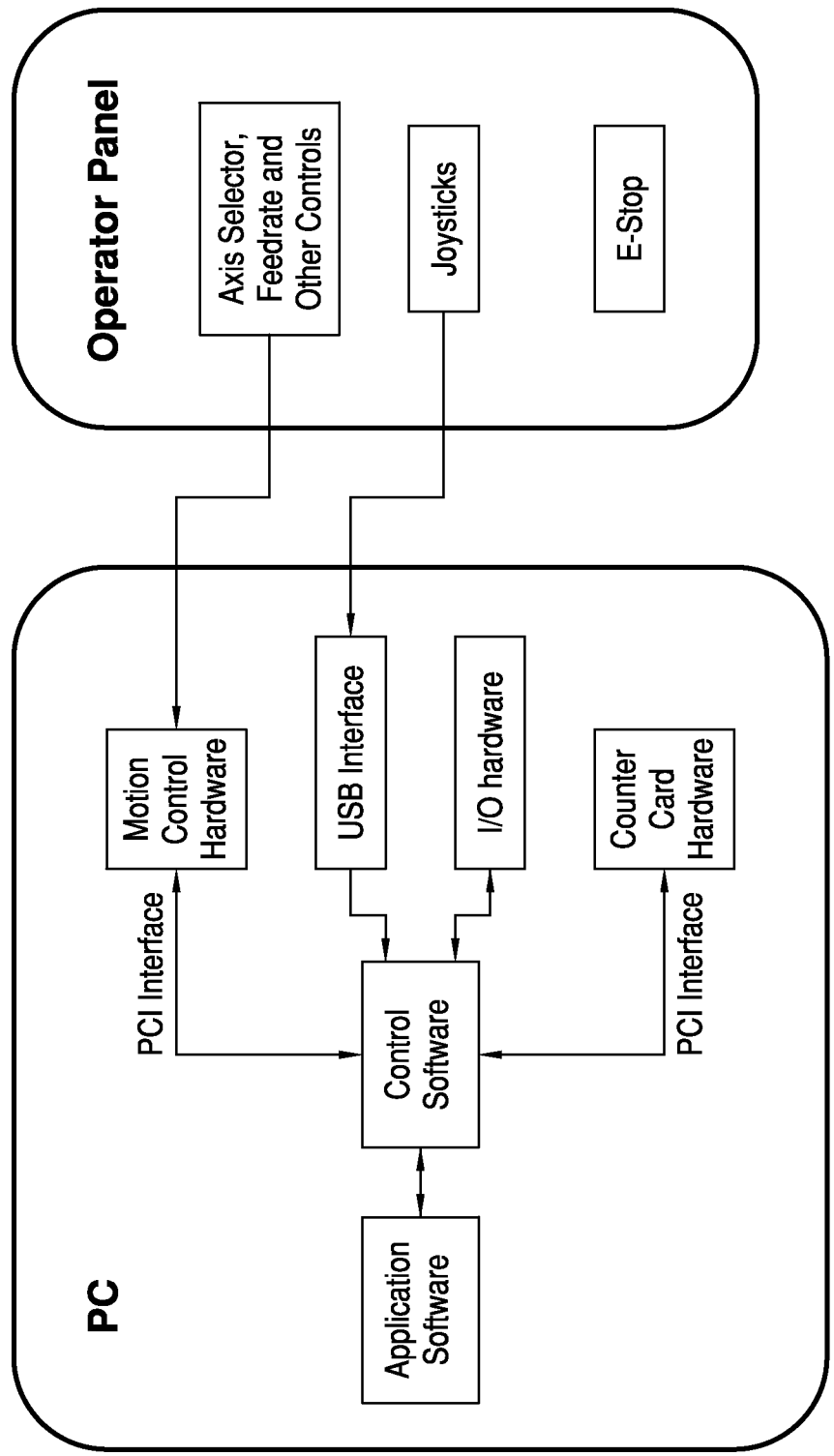
FIG. 4 diagrammatically shows a how the operator panel of FIG. 2(a) may be interfaced to a gear metrology machine.
Figure 10:
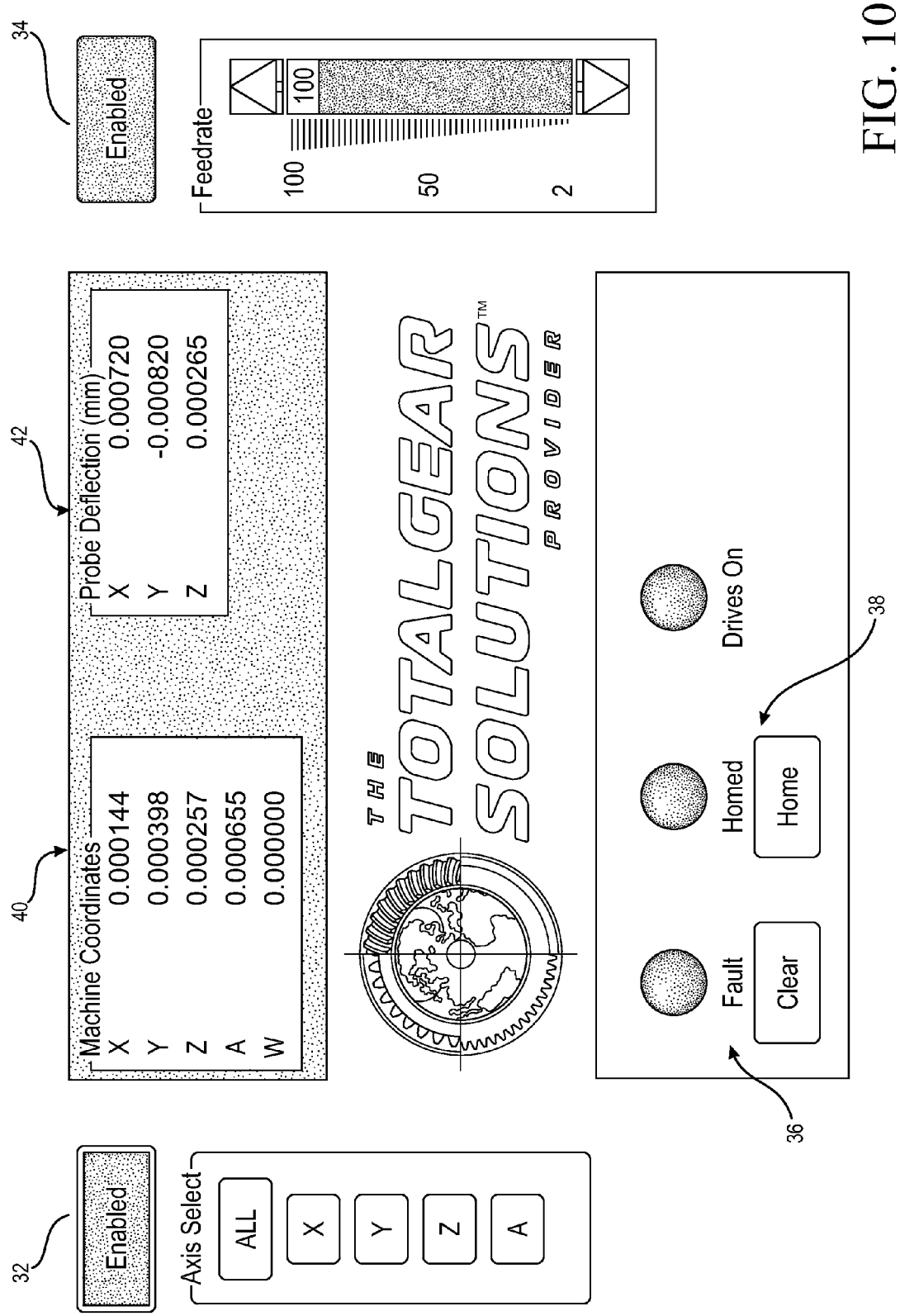

The control software creates a screen (form) and extends it to be displayed on the touch screen monitor 28 on the remote pendant 20 and handles the user input. FIG. 10 illustrates an example of a default screen displayed on the remote pendant when it is turned ON. The "Enabled" buttons/areas 32, 34 on the screen enable the joysticks, Axis Select and Feedrate controls on the remote pendant. When enabled, these controls together with Fault/Clear control 36 and Homed/Home control 38 replace all the functionality of the machine operator panel (FIG. 2a). Also, when enabled, the joysticks, axis select and feed rate controls on the machine operator panel are disabled so that the operator has single point of control. In addition, the machine coordinates (axis positions) 40 and probe deflections 42 may constantly be displayed on this screen by the control software. This is one of the benefits to the user when he is away from the operator station and cannot see the monitor.

Figure 6:
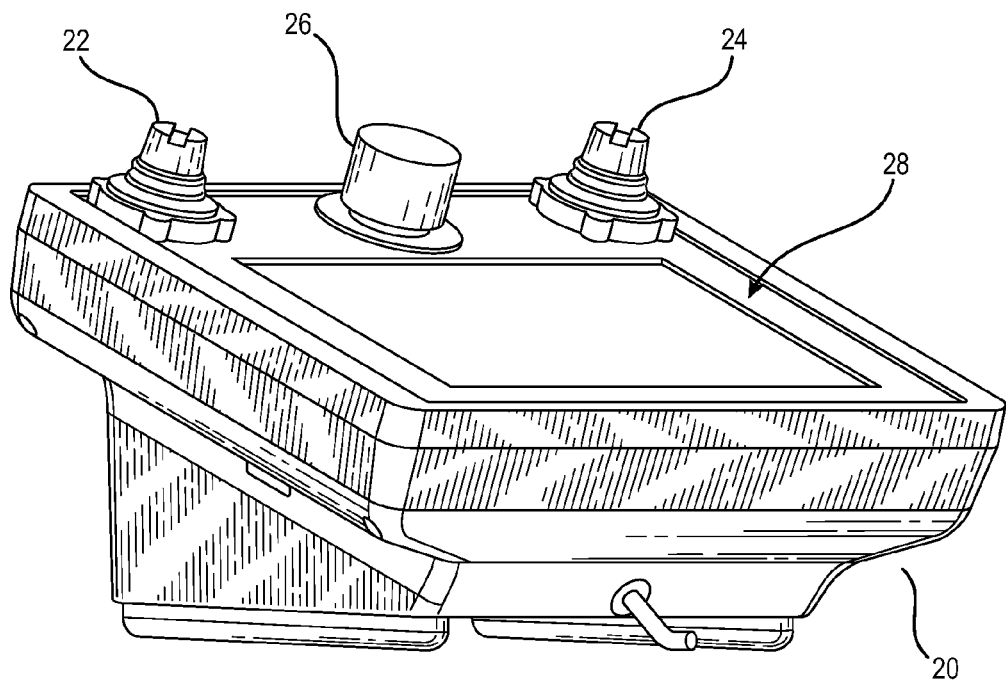
FIG. 6 illustrates the controls and touch screen of the inventive remote pendant.
Figure 7:
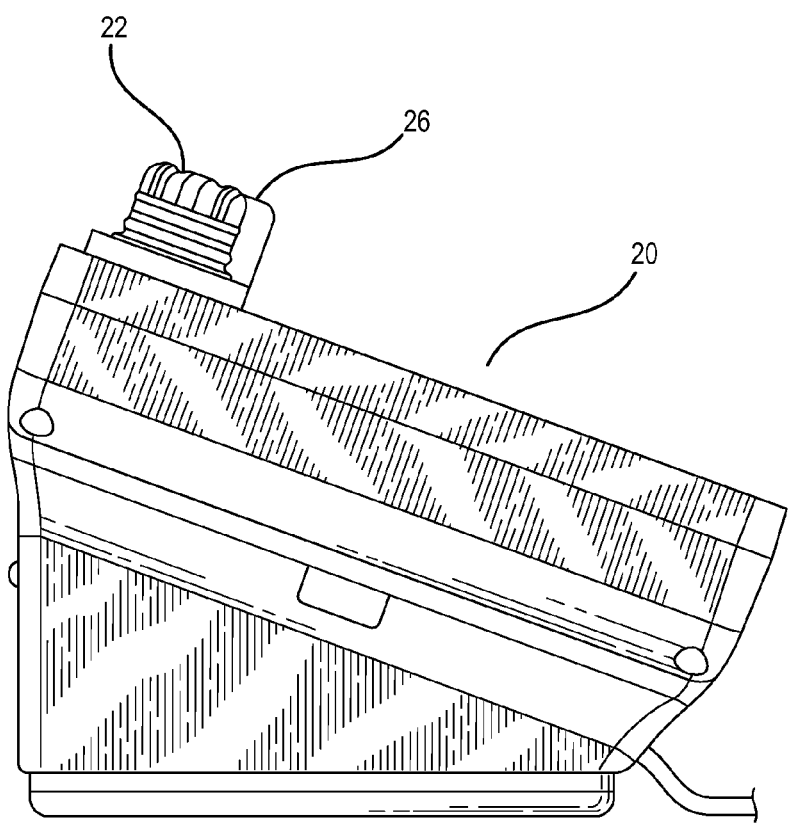
FIG. 7 is a side view of the remote pendant of the present invention.
Figure 8:
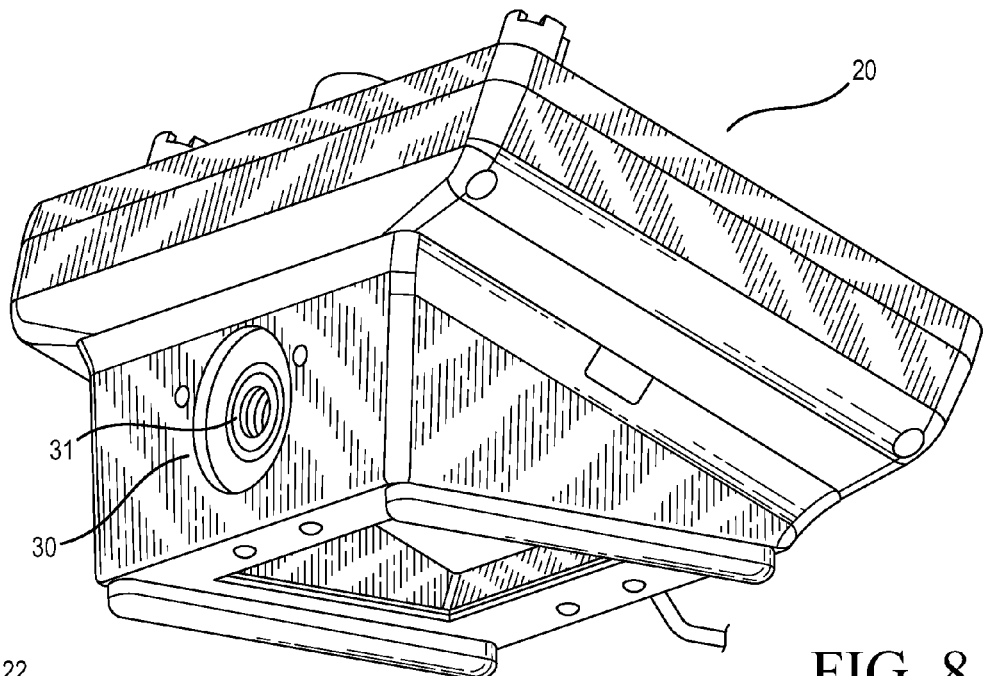
FIG. 8 shows the camera and microphone location on the inventive remote pendant.
Figure 9:
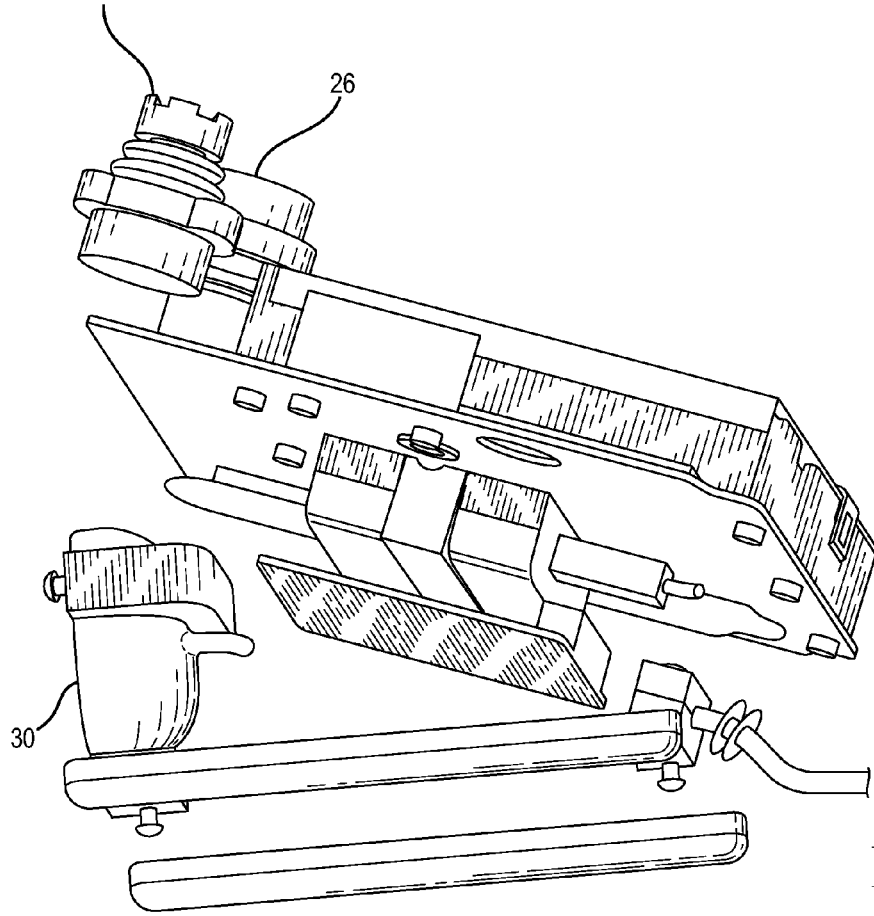
FIG. 9 illustrates individual elements of the inventive remote pendant.
Figure 11:
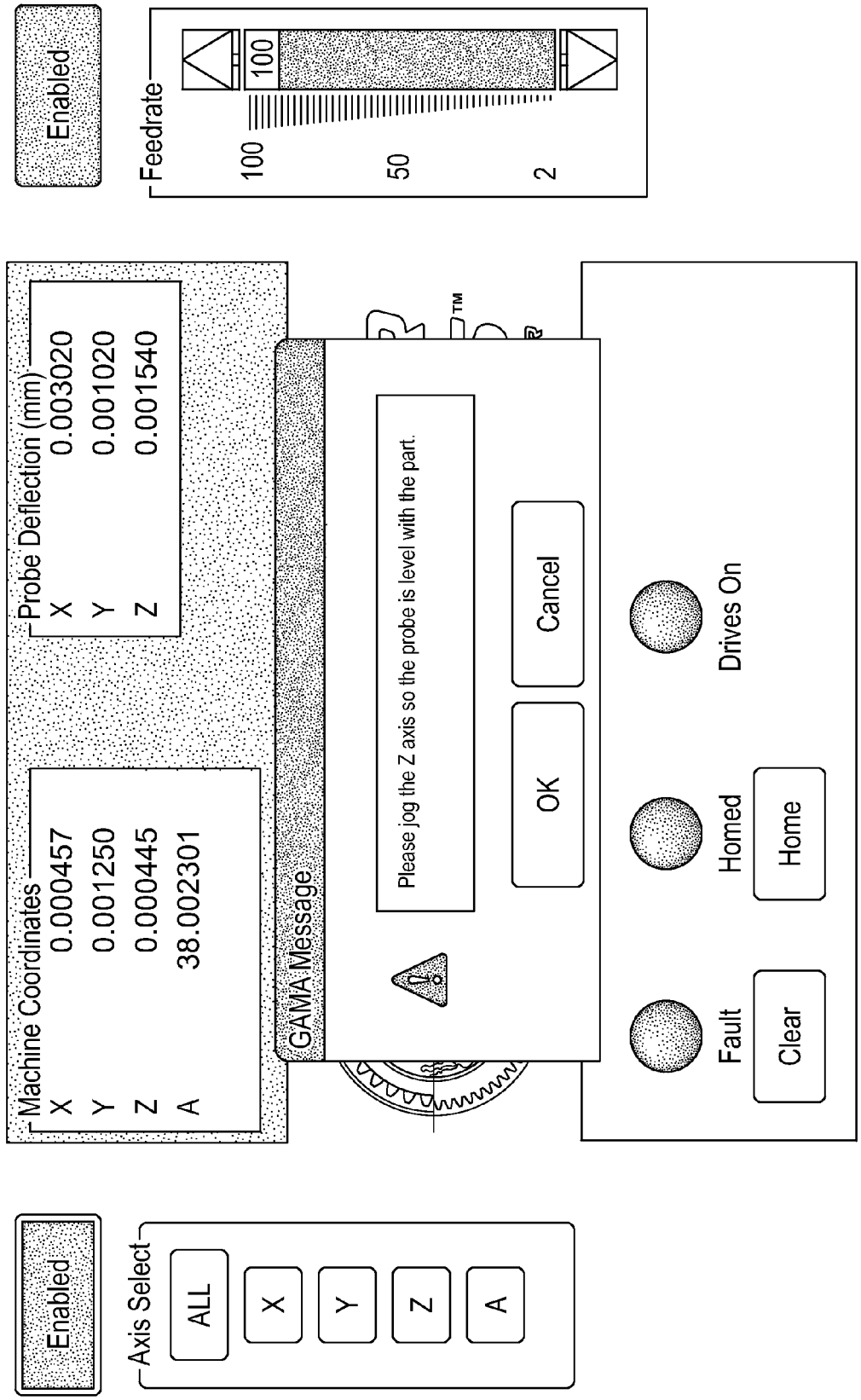
FIG. 11 shows an example of a message displayed on touch screen of the inventive remote pendant.

The application software preferably displays various prompts to instruct the user to perform certain functions such as moving the machine axes to the correct positions for starting a test. In addition, the application software also preferably displays informational messages and/or warning messages that the user is required to acknowledge. The remote pendant allows the user to interact with these messages without returning to the main screen and keyboard. The application software displays these messages on both the main screen and the remote pendant screen thereby allowing the user to interact with the message on either screen. The remote pendant messages have an enlarged button to make them easier to press using the touch screen 28 (FIG. 6). FIG. 11 shows an example of a message displayed on touch screen 28. The same message would also appear on the main screen of the operator station (FIG. 2a).

Other examples of where the message prompts are displayed on both the touch screen and main screen include:
Probe Crash
Start Test
  Clear probe before start of journal inspection
  Jog Z axis near the bottom edge to place probe where helix test will begin
  Jog Z on level with the part
  Jog probe into tooth gap
  Jog probe near the bottom/top of the tooth It should be understood that displaying of messages on both the remote pendant 20 and the main screen can be extended to any other instances where it is beneficial to the user to respond to the message without having to return to the main screen.

Figure 12:
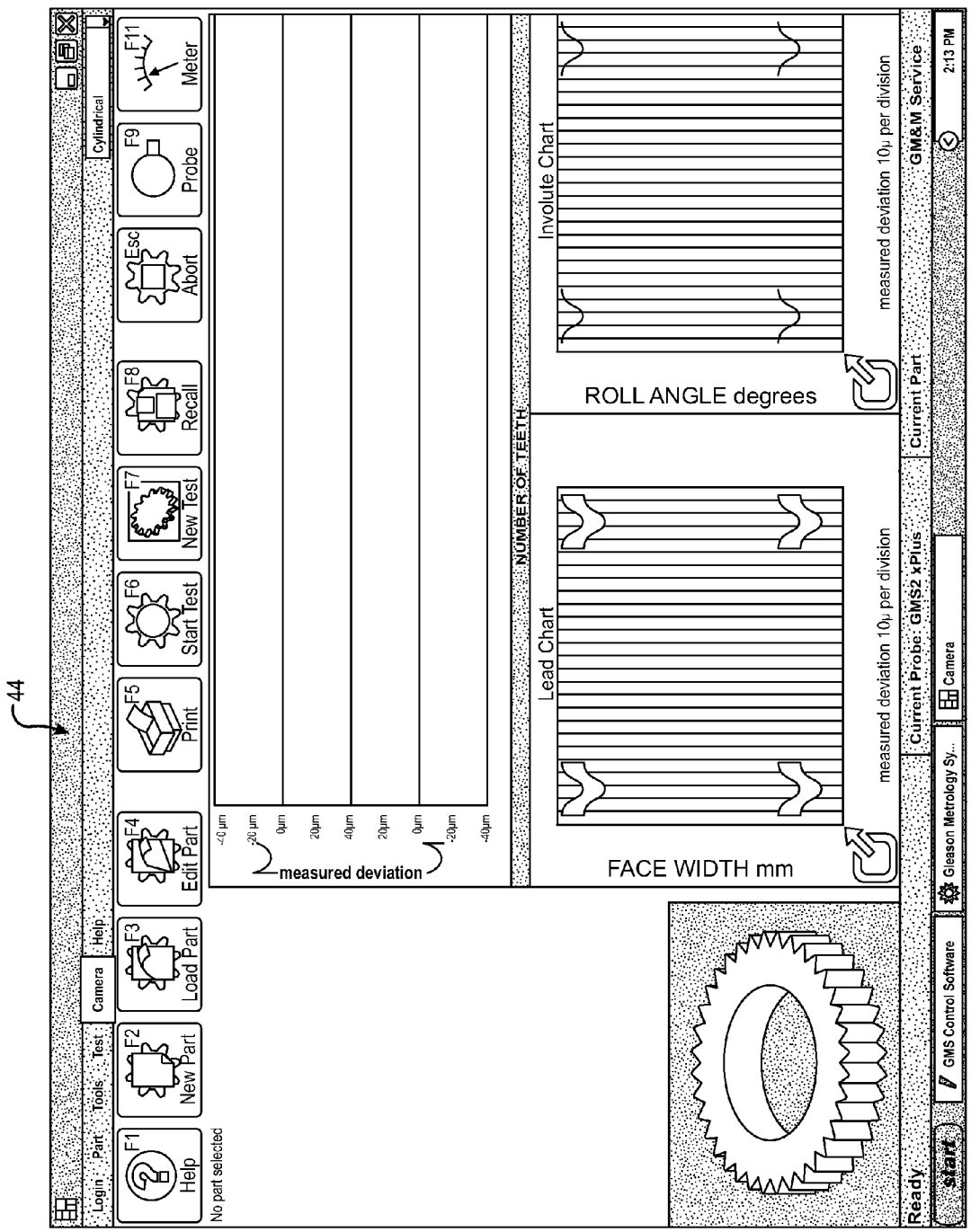
FIG. 12 shows a camera button on the main operator screen toolbar for activating the camera of the inventive remote pendant.

The application software provides an interface to the camera 30 on the remote pendant 20 to allow the user to take pictures of parts and part setups and save them for display as part of the standard work instructions, for example, in the application software. The camera interface is accessible from the application software main screen (FIG. 12) via a camera button 44 on the main screen toolbar. A camera button may also be included on the remote pendant 20 to allow the operator to enable the camera from the remote pendant. The camera interface displays the current view of the camera along with a button to shift the camera window between the main screen and the screen 28 of the remoter pendant (useful for remote diagnostics) and another button to take a picture. Once a picture is taken, a picture preview window is displayed and the user has the ability to save the picture to a file (e.g. the file of the currently loaded part) or discard the picture and return to the camera interface. The camera 30 may also be utilized in video mode so as to record a particular machine process or portion thereof. As with a picture, the video may also be saved to a file.

It is a common practice for personnel (e.g. service representatives, software engineers, etc.) to remotely log on to machines in the field to troubleshoot using diagnostic programs such as, for example, Cross-loop. This enables complete access to the computer and the ability to go to different screens and check the settings, error messages etc. However, the missing piece is the visual feedback on what the machine is doing and how the probe is positioned in space with respect to the gear being inspected. There is much reliance on the operators' description of the problem via the telephone. This can become especially cumbersome when the operator is either inexperienced in describing the problem or speaks a language different from the individual attempting to diagnose the problem.

The built-in webcam 30 will help solve this problem by continuously streaming video over the internet. The operator can turn on the webcam and position the remote pendant in such a location so as to show the problem he/she is facing. This will greatly reduce the amount of time involved in troubleshooting problems in the field. If desired, a speaker may be integrated into the remote pendant 20 to allow the operator to make a call over the internet (VoIP) without using a cellular phone. This will be useful in areas where cellular phone connections are not robust.

The microphone embedded in the webcam 30 is used by the application software to record audio notes into the part programs. The interface (see FIG. 13) includes a Record Note button 46, Play Note button 48 and Delete Note button 50. When a note is being recorded, the Record Note button 4 changes to read "Stop Recording". When the Stop Recording button is pressed the audio note is saved to the file of the particular part on the machine, along with, for example, the current operator name and a date/time timestamp. The application software controls the microphone/voice recording functions via standard multi-media software functions, such as those offered by Microsoft Windows for example.

Figure 13:
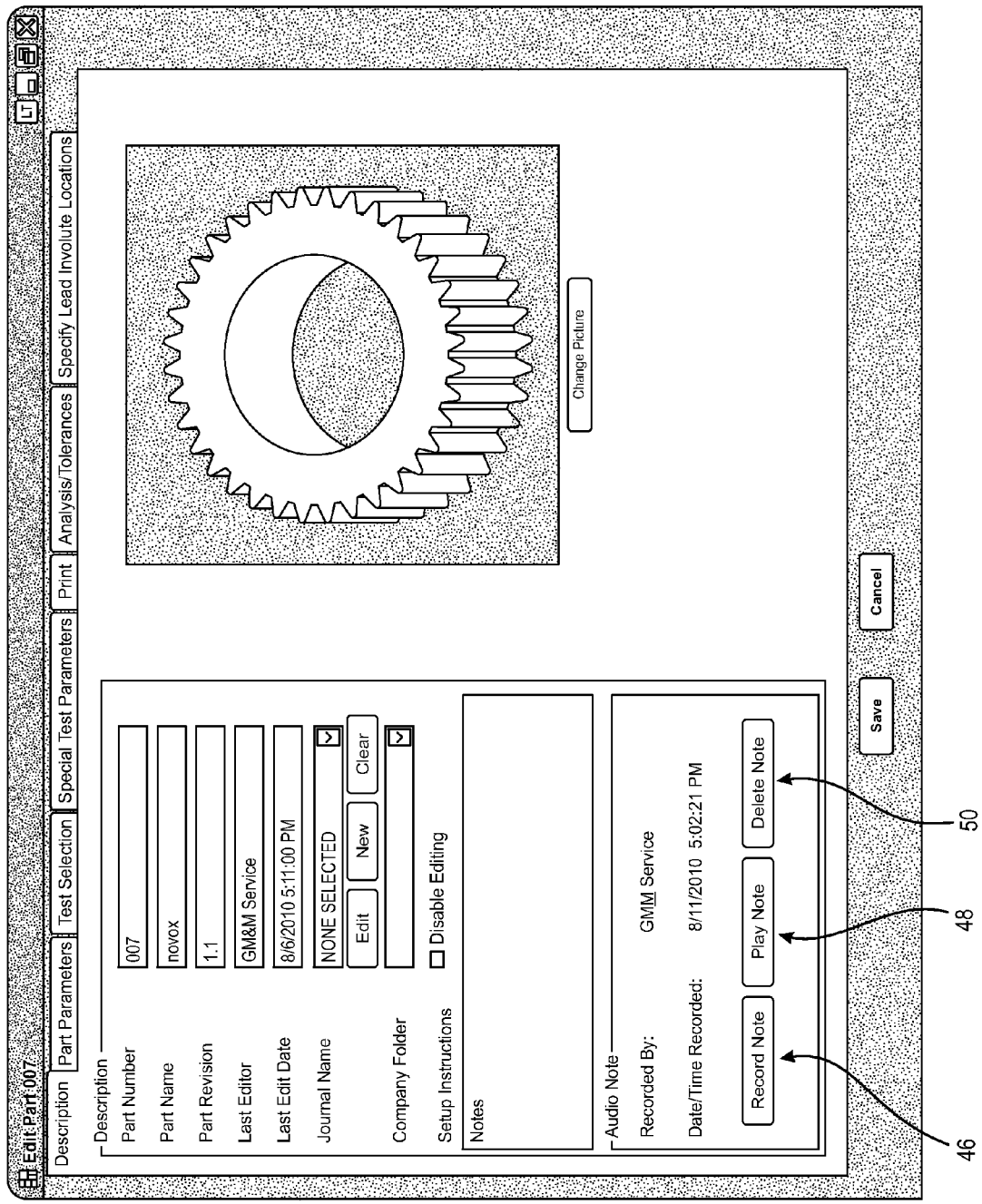
FIG. 13 shows an interface screen for the microphone located on the inventive remote pendant.

The interface screen of FIG. 13 may be displayed only on the main computer screen or on both the main screen and the screen 28 of the remote pendant 20. However, even if the interface screen is displayed only on the main screen, voice recording may be available via a screen displayed on the remote pendant touch screen 28 so that voice message recording and playback can occur without returning the operator station.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A remote pendant in communication with a computer controlled metrology machine, said machine having an operator panel including a main computer monitor,
   said remote pendant having a monitor and being transportable about said metrology machine,
   said remote pendant being an extension of said main computer monitor and comprising a non-configurable user interface,
   whereby information appearing on the main computer monitor is viewable on the monitor of said remote pendant, at least a portion of said information including one or more prompts to which an input response to said computer control is required, said remote pendant being operable to receive said one or more prompts and communicate said input response to said computer control.

2. The remote pendant of claim 1 wherein the pendant monitor is a touch screen monitor.

3. The remote pendant of claim 1 further comprising a microphone.

4. The remote pendant of claim 1 further comprising a camera.

5. The remote pendant of claim 4 wherein said camera is a video camera.

6. The remote pendant of claim 4 wherein said camera is a webcam.

7. The remote pendant of claim 1 further comprising a speaker for placing a call via the internet.

8. A multi-axis computer controlled metrology machine, said metrology machine having an operator panel and a main computer monitor in communication with the computer control, said metrology machine further comprising:
   a remote pendant having a monitor and communicating with the computer control, said remote pendant being transportable to locations about said machine, said remote pendant being an extension of said main computer monitor and comprising a non-configurable user interface,
   whereby information appearing on the main computer monitor is viewable on the monitor of said remote pendant, at least a portion of said information including one or more prompts to which an input response to said computer control is required, said remote pendant being operable to receive said one or more prompts and communicate said input response to said computer control.

9. The metrology machine of claim 8 wherein the pendant monitor is a touch screen monitor.

10. The metrology machine of claim 8 wherein said remote pendant further comprises a microphone.

11. The metrology machine of claim 10 whereby voice messages are recordable via said microphone on the remote pendant and stored in said computer control, said messages being played back via the operator panel or said remote pendant.

12. The metrology machine of claim 11 wherein a stored voice message is associated with a particular workpiece program by the computer control and wherein a machine operator is prompted to listen to said stored message when said workpiece program is run by said computer control at a later time.

13. The metrology machine of claim 8 wherein said remote pendant further comprises a camera, said camera being operable from said remote pendant.

14. The metrology machine of claim 13 whereby images taken by said camera on said remote pendant are stored in said computer control, said images being viewable via the operator panel or said remote pendant.

15. The metrology machine of claim 13 wherein said camera on said remote pendant comprises a video camera, said video camera being operable from said remote pendant.

16. The metrology machine of claim 15 whereby video taken by said video camera is stored in said computer control, said video being viewable via the operator panel or said remote pendant.

17. The metrology machine of claim 13 wherein said camera is a webcam, said webcam being operable from said remote pendant.

18. The metrology machine of claim 17 wherein images from said webcam are viewable on at least the main computer monitor, said images on the main computer monitor being further viewable from a location remote from said metrology machine via communication from said remote location with said computer control.

19. The metrology machine of claim 8 wherein said remote pendant further comprises a speaker for placing a voice call.

20. The metrology machine of claim 8 wherein said communicating is via one of USB, Ethernet or wireless.

21. The metrology machine of claim 8 wherein said operator panel and said remote pendant include joysticks, axis select controls and feed rate controls for controlling said metrology machine, said remote pendant further including means to enable control of said joysticks, axis select controls and feed rate controls via said remote pendant while simultaneously disabling control of said joysticks, axis select controls and feed rate controls via said operator panel.

22. The metrology machine of claim 8 wherein machine axis positions and probe deflection are constantly displayed on the monitor of said remote pendant.

\* \* \* \* \*